United States Patent [19]

Magocs

[11] Patent Number: 5,048,931

[45] Date of Patent: Sep. 17, 1991

[54] LIQUID CRYSTAL DISPLAY PROJECTION SYSTEM HAVING IMPROVED CONTRAST

[75] Inventor: Stephen Magocs, Knoxville, Tenn.

[73] Assignee: North American Philips Corporation, New York, N.Y.

[21] Appl. No.: 380,699

[22] Filed: Jul. 13, 1989

Related U.S. Application Data

[63] Continuation of Ser. No. 265,659, Nov. 1, 1988, abandoned, which is a continuation of Ser. No. 934,871, Nov. 25, 1986, abandoned.

[51] Int. Cl.$^5$ .................... G02F 1/13; G03B 21/14; G03B 21/00; H04N 9/31
[52] U.S. Cl. .................... 350/337; 350/345; 350/117; 353/20; 353/122; 358/61
[58] Field of Search ............... 350/337, 342, 345, 117; 353/20, 79, 122; 358/61, 232

[56] References Cited

U.S. PATENT DOCUMENTS

| | | | |
|---|---|---|---|
| 1,610,423 | 12/1926 | Cawley | 350/117 |
| 4,083,626 | 4/1978 | Miyahara et al. | 350/117 |
| 4,088,400 | 5/1978 | Assouline et al. | 350/337 |
| 4,239,349 | 12/1980 | Scheffer | 350/337 |
| 4,315,258 | 2/1982 | McKnight et al. | 350/337 |
| 4,614,619 | 9/1986 | Shannon | 260/397.2 |
| 4,637,896 | 1/1987 | Shannon | 428/1 |

FOREIGN PATENT DOCUMENTS 2185140 7/1987 European Pat. Off.

Primary Examiner—Stanley D. Miller
Assistant Examiner—Trong Phan
Attorney, Agent, or Firm—Edward W. Goodman

[57] ABSTRACT

For enhancing the contrast of a picture on a projection screen derived from a liquid crystal display, the analyzer, which is normally part of the liquid display unit, is incorporated either in front of or in back of the screen relative to the viewing area or may constitute a layer between the front and rear portion of the screen. In any of these positions, the presence of the analyzer will result in darker portions and therefore in enhanced contrast. When it is used in front of the screen relative to the viewing area, protection of the lenticular surface also results.

10 Claims, 1 Drawing Sheet

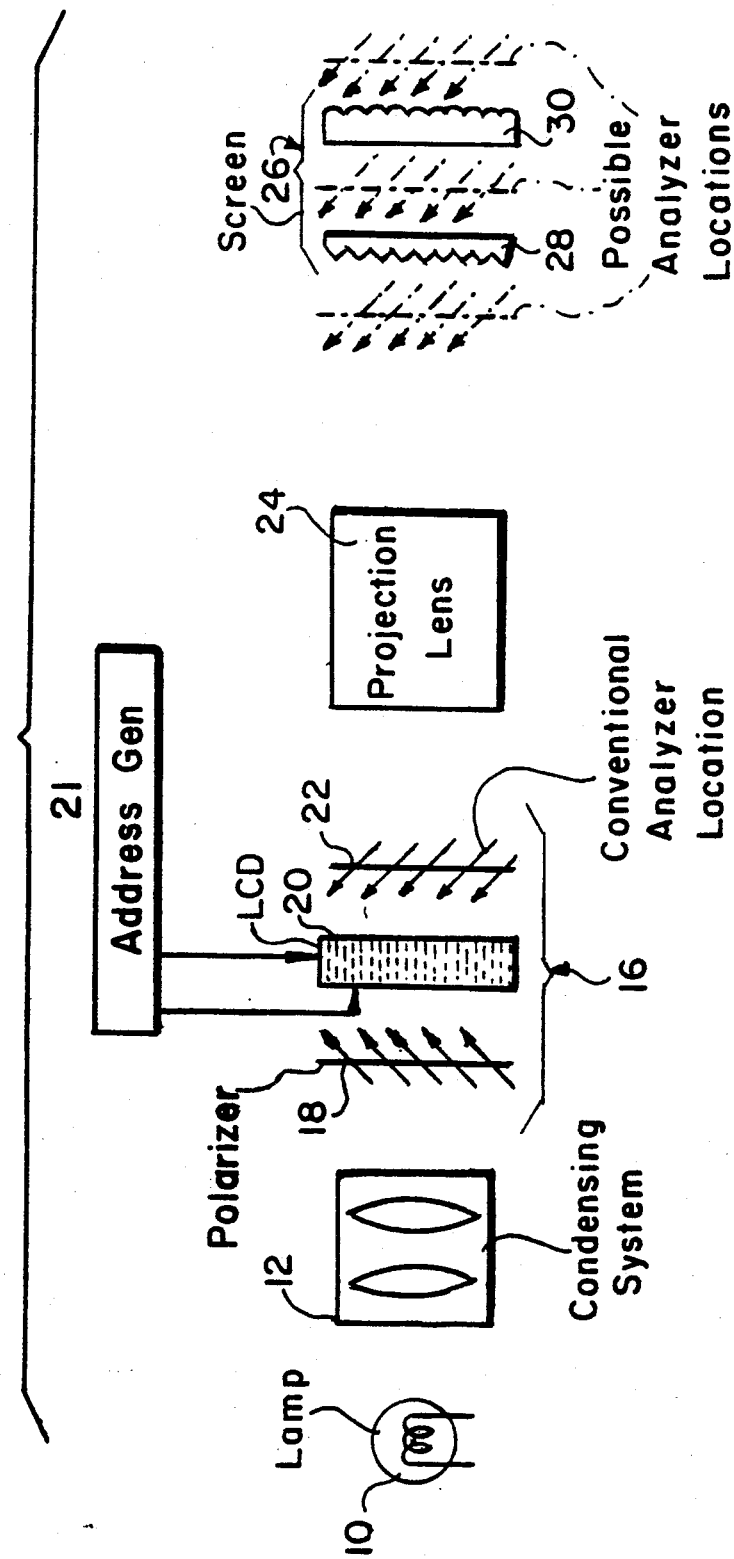

LIQUID CRYSTAL DISPLAY PROJECTION SYSTEM HAVING IMPROVED CONTRAST

This is a continuation of application Ser. No. 265,659, filed Nov. 1, 1988, which is a continuation of U.S. Ser. No. 934,871, filed Nov. 25, 1986, both now abandoned.

BACKGROUND OF THE INVENTION

1. Field of the Invention

The present invention relates to projection systems utilizing liquid crystal displays. In particular, it relates to projection television systems.

2. Background of the Disclosure

Rear projection television systems utilizing liquid crystal displays have been proposed In these known systems, the liquid crystal display consists of a polarizer, the actual liquid crystals, and an analyzer, all packaged as an unit. Light falling on the unit is polarized in a particular plane by the polarizer. This light, herein referred to as first polarized light, then passes through the liquid crystals. Liquid crystals which have been charged, i.e. to which an electrical signal has been applied, rotate the plane of polarization to a second plane. The light coming from the liquid crystals thus contains light polarized in a first plane and light polarized in a second plane. The analyzer then selects one of the planes, i.e. light polarized in one of the planes will pass through the analyzer, while light polarized in the other plane is blocked. The selected light then passes through a projection lens system and is imaged onto a projection screen.

A major problem with this type of projection arrangement is the lack of contrast resulting from loss of, on the average, 50% of the light in the analyzer. Even standard contrast enhancing techniques, such as blackening the grooves between the lenticulars on the front of the screen, use of diffusers, etc. do not yield a picture having adequate contrast.

SUMMARY OF THE INVENTION

It is an object of the present invention to increase the contrast in the picture on a projection screen generated by light from a liquid crystal display.

It is a further object of the present invention to create such contrast enhancement in an economical fashion and without changes in the basic operation of the system.

According to the present invention, a polarizer which polarizes light from a light source in a predetermined plane is followed by an array of liquid crystals. Each liquid crystal rotates the plane of polarization of light impinging upon it when a control signal is applied to it. If the liquid crystals are arranged in a matrix, the control signal may be the simultaneous energization of its column and line address inputs. The control signal is applied to the liquid crystals in accordance with the information to be displayed on a projection screen. Such information may, for example, be data or a television picture. The crystals are generally arranged in a plane, a projection screen being placed at a predetermined distance from the plane of the liquid crystals and parallel thereto. An analyzer is then interposed between the screen and the liquid crystal array, but closer to the screen. The analyzer is the same as the analyzer normally forming the output element in a liquid crystal display, i.e. transmits only light polarized in a particular plane. The selected light then forms the display on the screen.

Preferably, the analyzer is laminated onto the front surface of the screen. This tends to prevent damage to the screen as well as providing enhanced contrast.

Alternatively, the analyzer may be laminated to the rear surface of the screen or even centrally between the rear and front parts of the screen itself.

The operation of the system and further advantages thereof will best be understood with reference to the following description read in conjunction with the drawing.

BRIEF DESCRIPTION OF THE DRAWING

The single figure is a schematic diagram of a basic liquid crystal projection display illustrating both the conventional analyzer location and the possible analyzer locations in accordance with the present invention.

DESCRIPTION OF THE PREFERRED EMBODIMENTS

In the single figure, a source of illumination 10, e.g. a arc lamp, emits light which passes through a condensing lens system 12. The light passing out of condensing system 12 is constituted by substantially parallel rays of random polarization. This light passes through a liquid crystal display 16. Liquid crystal display 16 is constituted first by a polarizer 18 which polarizes the light in a first selected plane. The polarized light then impinges on a liquid crystal array, here denoted by reference numeral 20. The liquid crystals array will, in general, be matrix addressed. The actual addressing system is not part of the present invention and is not necessary for the understanding thereof. However, briefly, each liquid crystal will have two address leads, one for a column address, the other for a row address. The picture information to be transmitted is typically stored in sample-and-hold circuits, one for each column. All column address lines of a given row are tied together, as are all row address lines of a given column. The rows are energized in sequence, for example by a shift register. Each column element within a given row receives picture information stored in its sample-and-hold circuit. A particular liquid crystal is only charged when receiving a signal simultaneously on both of its address lines. When the crystal is uncharged, the light passes through without changing in the plane of polarization. When it is charged, light impinging upon is rotated to a second polarization plane, normally 90° removed from the first polarization plane. An analyzer 22, when locations indicated in the figure, then blocks light polarized in one of the planes, while transmitting the light polarized in the other plane. The analyzer will thus, on the average, suppress one-half of the light falling upon it.

The light at the output of the analyzer, when the analyzer is in its conventional location, then passes through a projection lens system 24 which focuses the image onto a projection screen 26. Projection screen 26 consists of a rear portion 28 and a front portion 30. The display created on front portion 30 is viewed by the audience.

The present invention is based on the realization that the analyzer itself would provide enhanced contrast if placed in the vicinity of, or incorporated with, the screen. Three possible locations, namely in front of the screen in the direction of light propagation, in back of the screen in the direction of light propagation or interposed as a central layer between the front and back portions of the screen are illustrated in the figure.

The analyzer and polarizer are generally made of the same material. A typical material is cellulose acetate butyrate. The analyzer is a plastic sheet several millimeters thick which is readily laminated onto the screen in any of the three indicated positions by use, for example, of a lacquer bond. Such lamination techniques are well known in the art and present no manufacturing difficulty.

Since the plane of polarization does not change either in the projection lens system or when the light passes through the screen, no error is introduced by positioning the screen in any of the three possible locations illustrated in the figure. For the type of screen illustrated, namely one which has a lenticular surface facing the audience and a fresnel surface at its rear, locating the analyzer between the lenticular surface and the audience will provide the additional benefit of protecting the screen from damage by scratches, dust, etc.

Although the present invention has been illustrated in conjunction with a highly simplified monochrome rear projection system, it is equally applicable to color television receiver applications and front projection systems. In fact, it is readily applicable in any system utilizing a liquid crystal display and a projection screen. The scope of the invention is thus not to be limited to the particular embodiments shown, but is to include various different implementations which will readily occur to one skilled in the art and which are encompassed by the following claims.

I claim:

1. An electro-optical display system comprising:
    an illumination source furnishing light rays;
    polarization changing means, for changing the polarization of light in response to a control signal, positioned in the path of said light rays so that said polarization changing means furnishes polarization output light comprising first polarized light in the absence of said control signal and second polarized light in response to said control signal;
    means for applying said control signal to said polarization changing means in accordance with information to be displayed;
    display means having a first side for displaying said information and a second side substantially parallel to said first side; and
    analyzer means positioned to receive said first polarized light and said second polarized light and furnishing only said second polarized light in response thereto, said analyzer means being laminated to said display means.

2. An electro-optical display system as set forth in claim 1, wherein said analyzer means is laminated to said first side of said display means.

3. A electro-optical display system as set forth in claim 1, wherein said analyzer means is laminated to said second side of said display means.

4. An electro-optical display system as set forth in claim 1, wherein said analyzer means forms a layer between said first and second sides of said display means.

5. An electro-optical display system as set forth in claim 2, wherein said display means comprises lenticules on said first side, whereby said analyzer means further constitutes protection for said lenticules.

6. An electro-optical display system as set forth in claim 1, wherein said illumination source comprises a lamp emitting light and polarizer means positioned in the path of said light for polarizing said light thereby creating said light rays.

7. An electro-optical display system as set forth in claim 6, wherein said light rays constitute said first polarized light.

8. An electro-optical display system as set forth in claim 1, wherein said polarization changing means comprises at least one liquid crystal.

9. An electro-optical display system comprising:
    an illumination source furnishing light rays;
    polarization changing means positioned in the path of said light rays for furnishing output light comprising first polarized light in the absence of a control signal and second polarized light, having a polarization different from said first polarized light, in response to a control signal;
    means for furnishing said control signal to said polarization changing means in accordance with information to be displayed;
    display means having a first side for furnishing a visual display corresponding to said information to be displayed and a second side substantially parallel to said first side;
    lens means arranged in the path of said output light for directing said output light onto said display means; and
    analyzer means disposed between said lens means and said display means for receiving said first polarized light and said second polarized light from said lens means and furnishing only said second polarized light to said display means for display thereon, said analyzer means being laminated to said display means.

10. An electro-optical display system as set forth in claim 9, wherein said lens means comprises projection lens means, and wherein said display means is the screen of a projection television.

* * * * *